United States Patent [19]

Yagasaki

[11] Patent Number: 5,486,862
[45] Date of Patent: Jan. 23, 1996

[54] MOTION PICTURE ENCODING SYSTEM

[75] Inventor: Yoichi Yagasaki, Kanagawa, Japan

[73] Assignee: Sony Corporation, Tokyo, Japan

[21] Appl. No.: 432,793

[22] Filed: May 2, 1995

Related U.S. Application Data

[62] Division of Ser. No. 949,397, Sep. 22, 1992.

[30] Foreign Application Priority Data

Sep. 30, 1991 [JP] Japan .................................. 3-278808

[51] Int. Cl.⁶ ........................................... H04N 7/24
[52] U.S. Cl. ........................ 348/399; 348/384; 348/390
[58] Field of Search ..................................... 348/384, 390, 348/399–402, 405, 409, 412, 413, 415, 416; H04N 7/130

[56] References Cited

U.S. PATENT DOCUMENTS

| | | | |
|---|---|---|---|
| 4,651,206 | 3/1987 | Ohki . | |
| 4,837,618 | 6/1989 | Hatori et al. . | |
| 4,985,768 | 1/1991 | Sugiyama . | |
| 4,987,490 | 1/1991 | Ohta . | |
| 5,038,209 | 8/1991 | Hang . | |
| 5,057,918 | 10/1991 | Denoyelle et al. . | |
| 5,068,724 | 11/1991 | Krause et al. | 348/402 |
| 5,079,630 | 1/1992 | Golin et al. . | |
| 5,089,888 | 2/1992 | Zdepski et al. . | |
| 5,091,782 | 2/1992 | Krause et al. | 348/400 |
| 5,136,371 | 8/1992 | Savatier et al. | 348/409 |
| 5,136,378 | 8/1992 | Tsurube | 348/415 |
| 5,144,426 | 9/1992 | Tanaka et al. . | |
| 5,144,427 | 9/1992 | Kitaura et al. . | |
| 5,150,432 | 9/1992 | Veno et al. . | |
| 5,237,410 | 8/1993 | Inoue | 348/409 |
| 5,241,383 | 8/1993 | Chen et al. | 348/405 |
| 5,260,783 | 11/1993 | Dixit | 348/401 |
| 5,357,281 | 10/1994 | Ikeda et al. | 348/401 |
| 5,365,271 | 11/1994 | Asano | 348/405 |

*Primary Examiner*—Tommy P. Chin
*Assistant Examiner*—Richard Lee
*Attorney, Agent, or Firm*—Limbach & Limbach

[57] ABSTRACT

In a motion picture encoding system, which permits encoding of motion picture with high encoding efficiency and also permits improvement of the picture quality, priority orders are set preliminarily to obtain encoding matched to man's sight characteristics. Preferential high picture quality encoding of a picture portion attracting attention can be obtained by setting a high priority order for that portion. An optimum combination intra- and forward, rearward and bi-directional predictive inter-frame encoding pattern can be selected for every N frames by preliminarily collecting information of a motion picture sequence to be encoded.

1 Claim, 10 Drawing Sheets

M = 1 : X P P P P ......

M = 2 : X B P B P ......

M = 3 : X B B P B B P ......

M = 4 : X B B B P B B B P ......

M = N : X B $\underbrace{......}_{N}$ B P B $\underbrace{......}_{N}$ B P ......

FIG. 11

MOTION PICTURE ENCODING SYSTEM

This is a divisional of application Ser. No. 07/949,397, filed Sep. 22, 1992.

BACKGROUND OF THE INVENTION

The present invention relates to motion picture encoding systems, and more particularly, to an improvement of encoding motion video signal in video signal transmission systems such as television telephone systems.

In a commonly termed video signal transmission system such as a television conference or television telephone system, in which a video signal is transmitted as a motion video signal to remote places, the video signal is encoded by utilizing its line correlation or inter-frame correlation. In this way, the efficiency of transmission of useful information is increased, thus making effective use of the transmission line.

FIG. 1 illustrates, at the top portion, an example of intra-frame encoding utilizing the line correlation of a video signal for transmitting the contents of picture data PC1, PC2, ... at respective instants $t_1, t_2, \ldots$ In this case, the picture data are processed for transmission by unit-dimensional encoding in the same scanning line.

FIG. 1 also illustrates, at the bottom portion, an example of inter-frame encoding utilizing inter-frame correlation of video signal. In this case, the pixel data differences between adjacent frame picture data PC1 and PC2, PC2 and PC3, ... are obtained as picture data PC12, PC23, ... to be transmitted, thereby improving the data compression factor.

Thus, this video signal transmission system can send out high efficiency encoded digital data to the transmission line, the data quantity of the digital data being far smaller compared to the case of transmitting all the picture data of the picture frames PC1, PC2, ...

FIG. 2 shows a motion picture encoding system 1. Here, an input video signal VD is fed to a pre-processing circuit 2 for conversion into luminance signal and color difference signal and then conversion in an analog-to-digital converter (not shown) into an 8-bit digital signal, which is output as input picture data S1.

The picture data which are sent out consecutively as the input picture data S1, are extracted from frame picture data FRM in a manner as shown in FIG. 3.

As shown in FIG. 3, the frame picture data FRM of one picture frame is divided half horizontally by two sets of 6 vertically grouped blocks GOB. Each grouped block GOB consists of 11 (horizontal) by 3 (vertical) macro-blocks MB. Each macro-block includes color difference data $C_b$ and $C_r$ which are constituted by color difference data corresponding to all the pixel data of luminance data $Y_1$ to $Y_4$ of 8 by 8 pixels.

In the grouped block GOB, the picture data are arranged such that they are continuous in units of macro-blocks MB. In the macro-blocks MB, picture data are continuous in units of very small blocks in the order of the raster scan.

In the macro-blocks MB, picture data ($Y_1$ to $Y_4$) of 16 by 16 pixels continuous in the horizontal and vertical scanning directions with respect to the luminance signal constitute a single unit as a block of data. On the other hand, the two corresponding color difference signals are processed for data quantity reduction and then time base multiplex processed to assign each of the very small blocks $C_r$ and $C_b$ to the 16 to 16 by pixel data.

A difference data generation circuit 3 receives the input picture data S1 and also the preceding frame picture data S2 of the preceding frame stored in a preceding frame memory 4 and thereupon obtains the difference between the data S1 and S2 to generate inter-frame encoded data (which is hereinafter referred to as inter-frame encoding mode). The inter-frame encoded data is output as difference data S3 to be coupled through a switching circuit 5 to a discrete cosine transformation (DCT) circuit 6 and also to a switching control circuit 7.

The switching circuit 5 is controlled by a control signal S4 which is output from the switching control circuit 7. If it is found that data can be transmitted in less data quantity by intra-frame encoding the data, the circuit 5 outputs the input picture data S1. On the other hand, if it is found that data can be transmitted in less data quantity by inter-frame encoding the data, the difference data S3 is output.

The DCT circuit 6 discrete cosine transforms the input picture S1 or difference data S3 in units of very small blocks by utilizing the two-dimensional correlation of video signal and outputs resultant discrete cosine transformed data S5 to a quantization circuit 8.

The quantization circuit 8 quantizes the transformed data S5 in a quantization step size which is determined for each grouped block GOB. Quantized data S6 that is obtained at the output terminal of the quantization circuit 8 is fed to a variable length coding (VLC) circuit 9 and also to an inverse quantization circuit 12.

The VLC circuit 9 variable length encodes the quantized data S6 and feeds the result as transmission data S7 to a transmission buffer memory 10.

The transmission buffer memory 10 stores the transmission data S7 and outputs it as output data S8 at a predetermined timing to a transmission line 11. Also, the memory 10 feeds back a quantization control signal S9 in units of grouped blocks GOB to the quantization circuit 8 according to the quantity of residual data in the memory 10 for quantization step size control.

In this way, the transmission buffer memory 10 controls the quantity of data generated as the output data S8 to retain an adequate residual quantity (i.e., a quantity not to cause overflow or underflow) of data in it.

When the quantity of residual data in the transmission buffer memory 10 is increased up to a permissible upper limit, the transmission buffer memory 10 increases the quantization step size, i.e., quantization step size STPS (in FIG. 4) of the quantization circuit 8 according to the quantization control signal S9, thus reducing the data quantity of the quantized data S6.

When the quantity of residual data in the transmission buffer memory 10 is conversely reduced down to a permissible lower limit, the transmission buffer memory 10 reduces the quantization step size STPS of the quantization circuit 8 to increase the data quantity of the quantized data S6.

The inverse quantization circuit 12 inverse quantizes the quantized data S6 output from the quantization circuit 8 to a typical value, thus obtaining inverse quantized data S10, and decodes the quantized data S6 into inverse quantized data equivalent to the transformed data S5 before quantizing in the quantization circuit 8. The inverse quantized data S10 is fed to an inverse discrete cosine transformation (IDCT) circuit 13.

The IDCT circuit 13 processes the inverse quantized data S10, obtained by the decoding in the inverse quantization circuit 12, in an inverse manner to the process in the DCT circuit 6, to obtain decoded picture data S11, which is output to a preceding frame data generation circuit 14 and also to a switching circuit 15.

Thus, the output data S8, which is sent out to the transmission line 11 and reproduced on the receiving side, can be decoded on the transmitting side as well, i.e., in the IDCT 13, to restore the input picture data S1 or difference data S3 before transforming in the DCT circuit 6.

More specifically, when the video signal VD is intra-frame encoded for transmission, the IDCT 13 restores the input picture data S1, while it restores the difference data S3 in case of inter-frame encoding the video signal VD for transmission.

The frame data generation circuit 14 adds together with the preceding frame data S2 fed back from the frame memory 4 and the decoded picture data S11 to restore the preceding frame data that has been output as the output data S8. The restored data is fed through the switching circuit 15 to the preceding frame memory 4. In this way, pictures which are transmitted to the receiving side are consecutively restored and stored in the preceding frame memory 4.

The switching circuit 15 is switched under control of the control signal S4 which is delayed by the delay circuit 16 for a period of time required from the discrete cosine conversion of the video signal VD until the inverse discrete cosine conversion.

In the motion picture encoding system having the above construction, it is presently the practice to alter the encoding system for the control of the quantity (i.e., bit quantity) of generated information. However, the control does not depend on the content or character of the picture data. There have been some trials of encoding systems, the control of which depend on the picture. However, no present system can flexibly deal with various different kinds of pictures, and in effect it has been impossible to enhance the subjective picture quality.

Further, in such motion picture encoding systems, it is determined for each frame in accordance with a certain pattern whether intra-frame encoding or inter-frame encoding based on forward, rearward and bidirectional prediction is to be done. Therefore, when the statistical characteristic of the motion picture is changed, an optimum encoding manner can not be selected. Consequently, it is impossible to expect high encoding efficiency.

SUMMARY OF THE INVENTION

In view of the foregoing, an object of the present invention is to provide a motion picture encoding system with high encoding efficiency and which also permits improvement of the picture quality.

To solve the above problems, according to a first aspect of the present invention there is provided a motion picture encoding system for either intra-frame encoding or inter-frame encoding a motion picture, comprising a means for setting, prior to any encoding operation, a priority order for small areas as units of encoding in a certain one of a plurality of frames to be encoded, the priority order establishing a quantization step size to be used, means for encoding the whole certain one of the plurality of frames in accordance with the priority order set for the small areas, means for detecting motion information and revising the priority order for corresponding small areas of succeeding frames in the sequence of frames according to the motion information, and a means for changing the encoding system for each predetermined portion of the motion picture according to the priority order.

In another embodiment of the invention a motion picture encoding system for either intra-frame encoding or inter-frame encoding a motion picture which includes a sequence of frames, comprises a first encoding means for encoding at least a portion of the motion picture by intra-frame encoding, a second encoding means for encoding at least a portion of the motion picture by inter-frame encoding, means for obtaining a first quantity of data from the first encoding means when it encodes a target frame using a quantization step size which was used for a preceding frame and a second quantity of data from the second encoding means when it encodes the target frame using the quantization step size which was used for a preceding frame, and means for selecting the first encoding means if the first quantity of data is less than the second quantity of data and otherwise selecting the second encoding means.

In still another embodiment of the invention a motion picture encoding system for either intra-frame encoding or inter-frame encoding a motion picture which includes a sequence of frames, comprises a first encoding means for encoding at least a portion of the motion picture by intra-frame encoding, a second encoding means for encoding at least a portion of the motion picture by inter-frame encoding, means for subtracting a low-frequency component from an intra-frame difference signal for a frame and producing a first absolute sum signal of a result of the subtracting, means for producing a second absolute sum signal of inter-frame difference data for a frame, and means for comparing the first absolute sum signal with the second absolute sum signal and selecting the first encoding means if the second absolute sum signal is greater than the first absolute sum signal and otherwise selecting the second encoding means.

In yet a further embodiment of the invention a motion picture encoding system for either intra-frame encoding or inter-frame encoding a motion picture which includes a sequence of frames, comprises a first encoding means for encoding at least a portion of the motion picture by intra-frame encoding, a second encoding means for encoding at least a portion of the motion picture by inter-frame encoding, means for obtaining inter-frame difference data for a current frame, means for obtaining inter-frame difference data for a frame next to be encoded, and means for selecting the first encoding means if the difference data for the next frame to be encoded is greater than a multiple of a predetermined integer (equal to or greater than one) times the difference data for the current frame, and otherwise selecting the second encoding means.

In yet still another embodiment of the invention, a motion picture encoding system for either intra-frame encoding or inter-frame encoding a motion picture which includes a sequence of frames, comprises intra-frame encoding means for encoding at least a portion of the motion picture by intra-frame encoding, determining means for inter-frame encoding a target frame and then determining whether each of a plurality of small areas of a target frame is to be inter-frame encoded or intra-frame encoded, and means for selecting the intra-frame encoding means to encode the target frame if the determining means determines that a predetermined percent of all of the plurality of small areas are to be intra-frame encoded, and otherwise selecting the target frame as inter-frame encoded by the determining means.

In a still further embodiment of the invention, a motion picture encoding system for either intra-frame encoding or forward, rearward and bi-directional predictive inter-frame encoding a motion picture which includes a sequence of frames, comprises a means for encoding a given frame X by one of either intra-frame encoding or forward predictive inter-frame encoding, means for forward predictive encoding for a first case an (N−1)th frame and then for a second case an Nth frame, where N is a positive integer greater than X, means for bi-directional inter-frame encoding for the first case each frame of a sequence of flames between frame X and the (N−1)th frame and then for the second case each frame of a sequence of flames between frame X and the Nth frame, means for determining an estimate of the generated data quantity for flames encoded according to the first case and producing a corresponding signal D(N−1) and for determining an estimate of the generated data quantity for frames encoded according to the second case and producing a corresponding signal D(N), and means for comparing the quantities D(N−1)/(N−1) and D(N)/N and forward predictive inter-frame encoding the (N−1)th frame and bidirectional inter-frame encoding flames in the motion picture between frame X and the (N−1)th frame if:

$$\{D(N-1)/(N-1)\}<\{D(N)/N\}$$

and otherwise forward predictive inter-frame encoding the (N)th frame and bidirectional inter-frame encoding the flames in the motion picture between frame X and the Nth frame.

The above features of the present invention permit, for instance, encoding matching the characteristic of man's vision by suitably setting an appropriate priority order and also preferential high picture quality encoding of a picture portion attracting a particular attention by setting a high priority order for that portion. At any rate, it is possible to flexibly cope with various kinds of pictures to enhance the subjective picture quality.

Further, by permitting preliminary collection of information of a motion picture sequence, it is possible to obtain optimum selection of the combination pattern of intra-frame encoding and forward, rearward and bi-directional predictive inter-frame encoding for each sequence of frames 1 to N and also obtain optimum selection of the intra- or inter-frame encoding for each frame. Thus, it is possible to greatly improve the efficiency of encoding. Further, it is possible to permit selection of the intra-frame encoding in accordance with, for instance, a scene change or when the extent of motion in the scene is increased although the scene is not changed. In this way, it is possible to provide both random access property and high encoding efficiency at a time.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 11 is a view for explaining the operation of the sixth embodiment of the invention.

DETAILED DESCRIPTION OF THE INVENTION

Preferred embodiments of this invention will be described with reference to the accompanying drawings.

Figure 1:
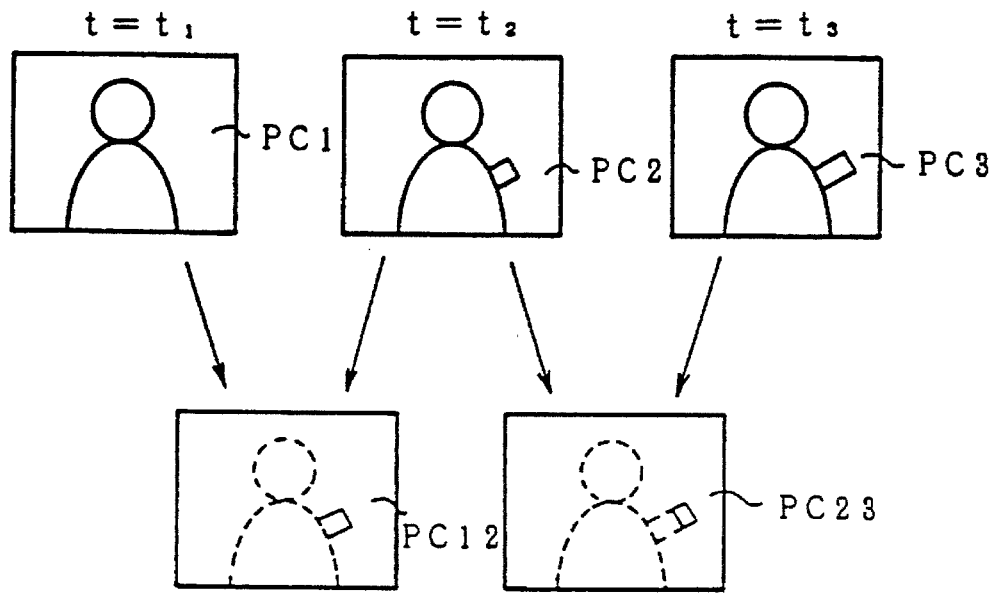
FIG. 1 is a graphic for explaining an intra-/inter-frame encoding process.
Figure 4:
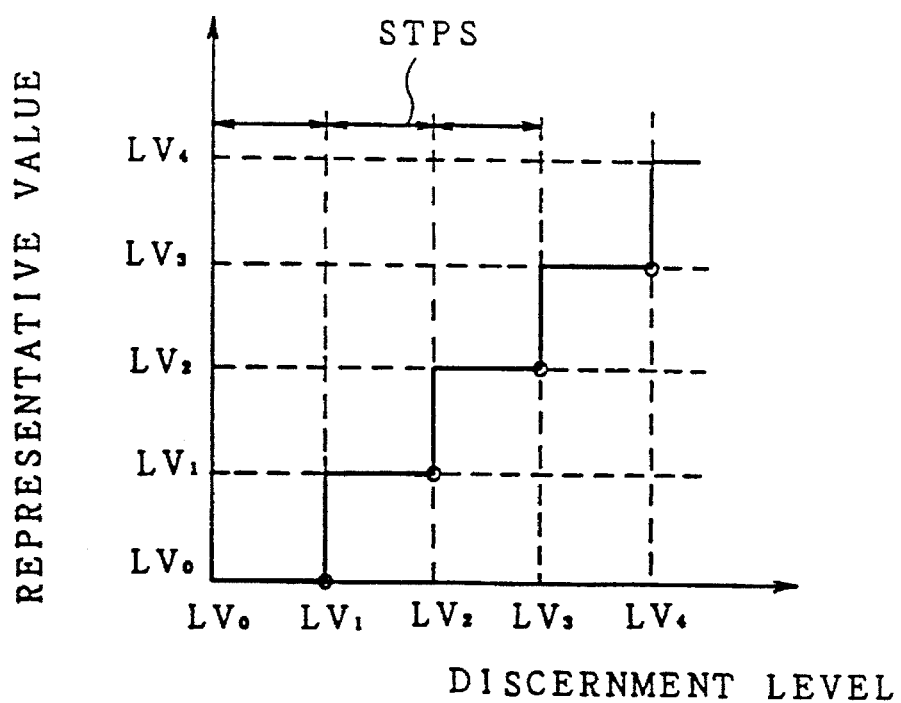
FIG. 4 is a graph for explaining a quantization step.
Figure 2:
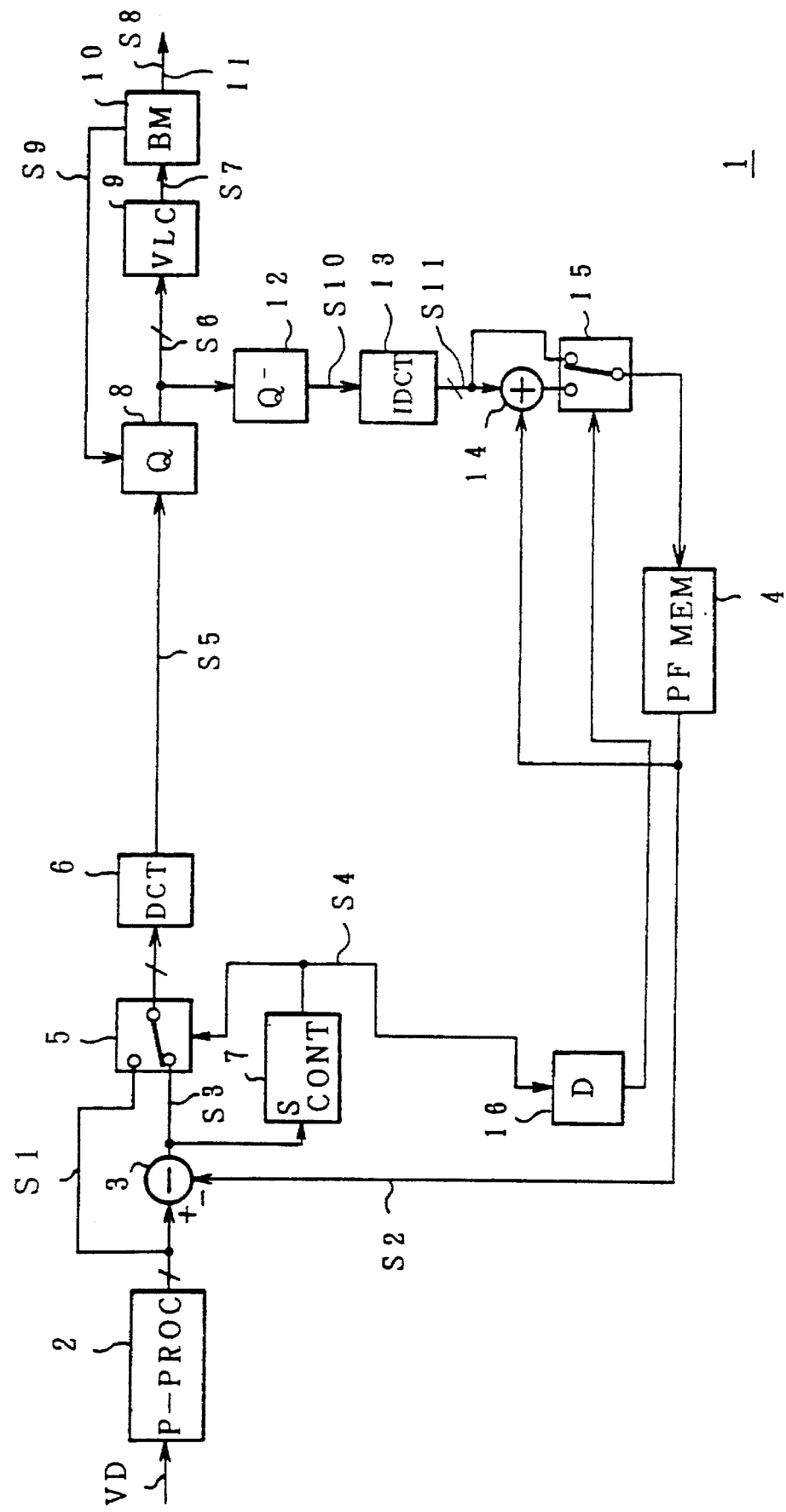
FIG. 2 is a block diagram for explaining a prior art motion picture encoding system.
Figure 3:
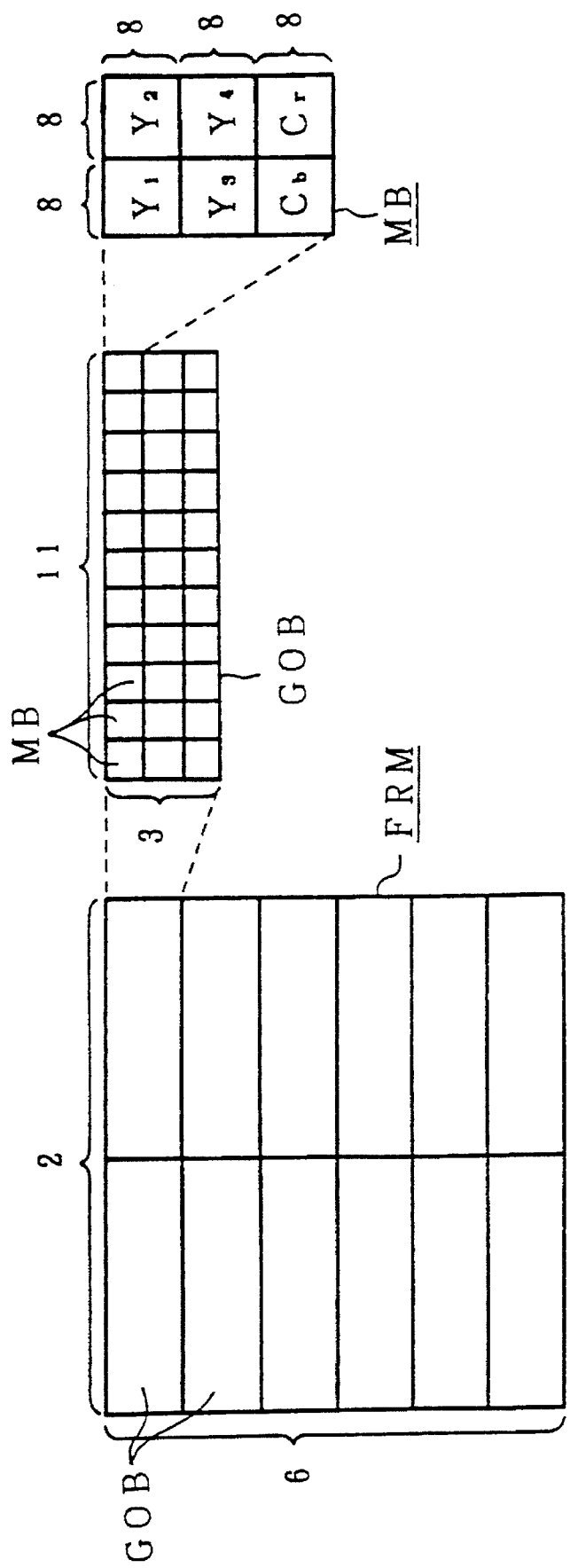
FIG. 3 is a view showing the configuration of frame picture data.

In the first embodiment, the motion picture encoding system as shown in FIG. 2 is used to set the priority order for each small area of a certain frame as a unit of encoding or for a certain greater portion of the frame. More specifically, prior to the encoding a high priority order is set for a portion attracting a viewer's attention (for instance a man's image) or portions prone to the recognition of picture quality deterioration in accordance with a demand on the encoding side.

Figure 5A:
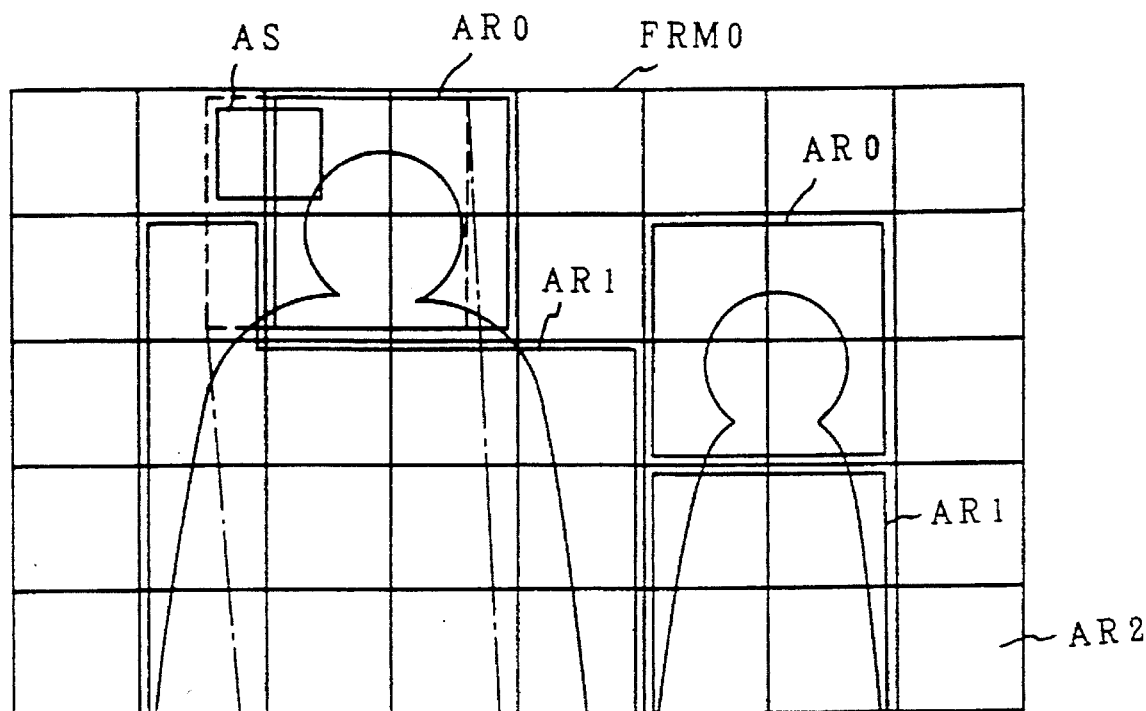
FIGS. 5A and 5B are graphics for explaining a first embodiment of the motion picture encoding system according to the present invention.

To this end, the encoder has an input unit for setting a priority order and a memory corresponding to the small frame area as a unit of encoding and stores the priority order set for each small area. More specifically, as shown in FIG. 5A, a frame FRM0, for which priority orders are to be set, is displayed on a CRT or the like, and priority orders are set on the encoding side by seeing the display and using a mouse or the like for designating positions in the displayed frame.

Here, a specific algorithm in this embodiment is shown. In a first step, priority orders are set for small areas AS as units of encoding in a certain one of a plurality of frames, these priority orders being stored in the memory. In a second step, the frame, for which the priority orders have been set, is encoded in accordance with the priority orders. More specifically, for an area with a high priority order set therefor a smaller quantization step size or dimension than a standard one for the whole frame is used for quantization according to that priority order.

As for the frames, for which no priority order is set, in a first step prior to encoding by either intra- or inter-frame encoding, motion detection is effected for a frame to be encoded with respect to the preceding frame, for which priority orders are provided, and the priority orders are revised according to detected motion information.

Figure 5B:
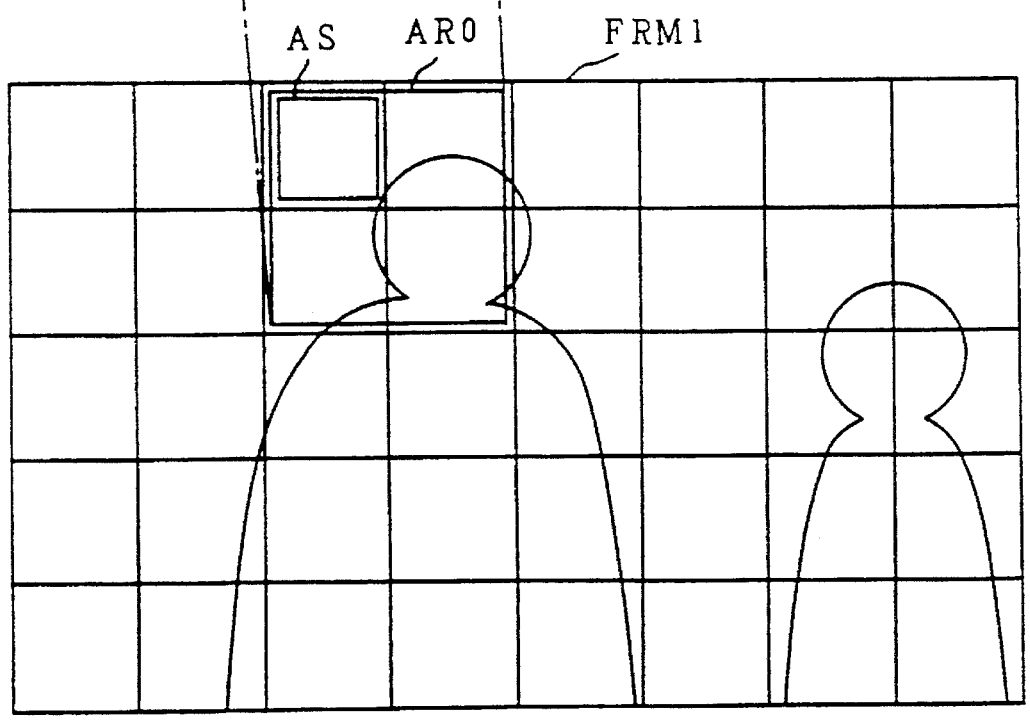

In an example of succeeding priority orders, a popular block matching method is used for motion detection. In the block matching method, as shown in FIG. 5B, each block in a frame FRM1 to be encoded is matched to a block of the least difference with respect to the preceding frame FRM0, and thus its picture is substantially the same as the picture of the preceding frame block.

This means that small areas AS included in certain blocks AR0, AR1, ... succeed to the same priority orders as those for the corresponding small areas AS in the blocks AR0, AR1, ... of the preceding frame. Thus, the same pictures are encoded with the same priority orders. In this way, it is possible to meet demands on the encoding the side when encoding picture.

In the case of methods other than the block matching method for motion detection, the priority order may be succeeded for each small area in the inter-frame correspondence. In this case, there is a problem that a small area AS may not always be in like position in, for instance, block AR0 which is in motion vector inter-frame correspondence as shown in FIGS. 5A and 5B.

To cope with this problem, there are various methods. For example, the same priority area as that of the largest one of corresponding areas or the average of the priority orders for all the corresponding areas may be succeeded. In either case, any small area to be encoded succeeds the priority order from the preceding frame, and in the second step the frame is encoded according to these succeeded priority orders.

With the above algorithm, once priority orders are set for a frame, they are succeeded subsequent by succeeding frames. Thus, it is possible to obtain automatic control for the encoding system and flexibly cope with various kinds of pictures, thus enhancing the subjective picture quality.

With the above algorithm, it is necessary in practice to detect motion for the priority orders to be succeeded. In case of encoding a frame by intra-frame encoding, however, no motion detection is necessary. Besides, there is hardware available for performing motion detection, and it may be used for inter-frame encoding. Further, when a frame is inter-frame encoded, motion detection is effected. Thus, its result may be used directly.

Shown in FIGS. 5A and 5B are respective two consecutive frames FRM0 and FRM1. In the figures, the small area AS is a unit of encoding consisting of, for instance, an 8 by 8 pixel block, and the blocks AR0, AR1, . . . are respective combinations each of four small areas. Numerals 0, 1, . . . represent priority orders in their order.

With the above constitution, by setting the priority orders to match the characteristic of a viewer's vision, for instance, it is possible to encode pictures so as to match such a viewer's vision characteristic. Also, by setting a high priority order for the picture portion attracting attention that the portion can be preferentially encoded with high picture quality. Thus, it is possible to realize a motion picture encoding system which can flexibly cope with various kinds of pictures and thereby enhance the subjective picture quality.

Figure 6:
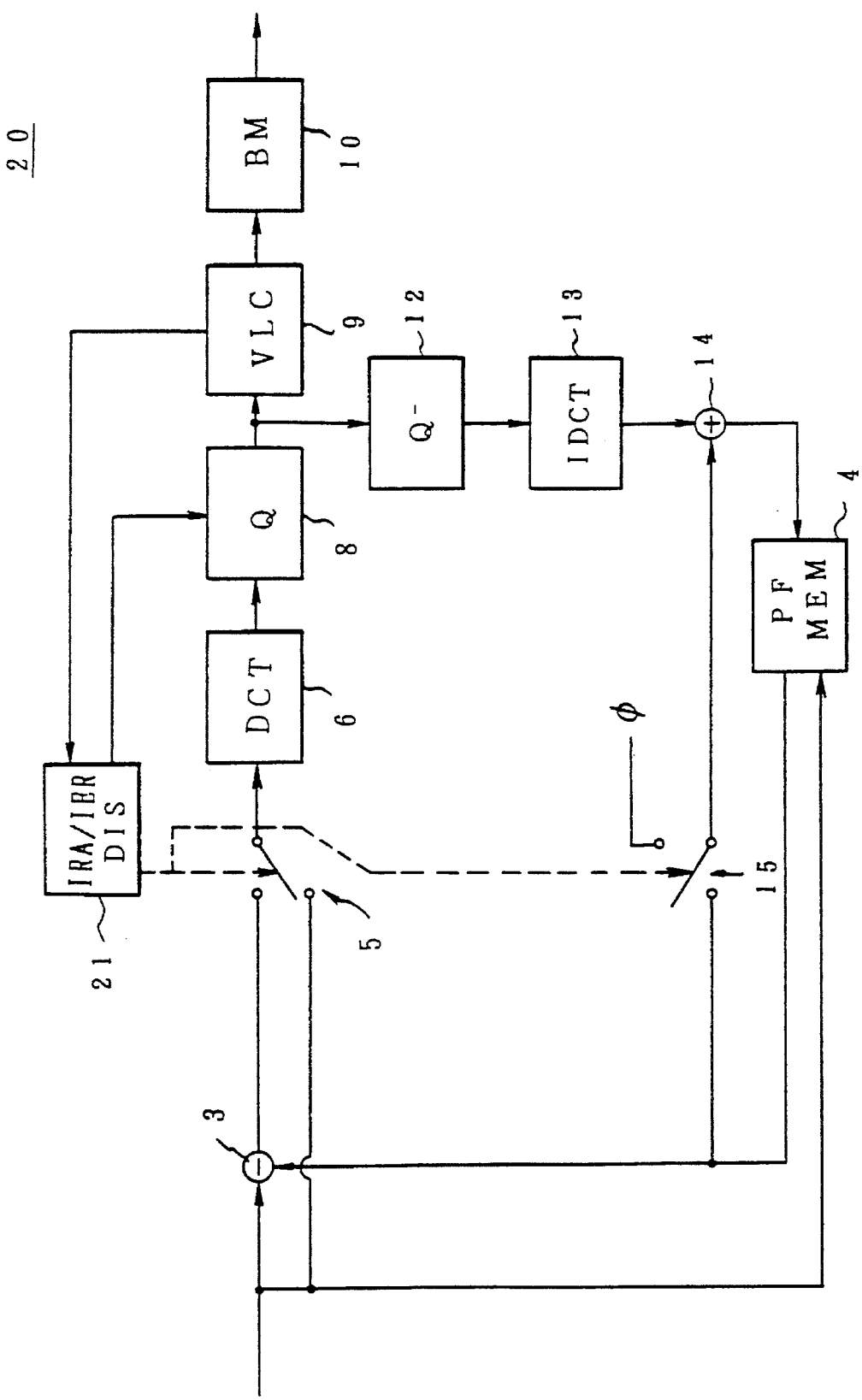
FIG. 6 is a block diagram showing a second embodiment of the motion picture encoding system according to the present invention.

FIG. 6 shows a second embodiment the motion picture encoding system. In the figure, parts corresponding to those in FIG. 2 are designated by like reference numerals. An intra-/inter-frame discriminator 21 detects the quantity of data generated in the VLC circuit 9, and an optimum combination intra- and inter-frame encoding pattern is determined in a sense that the picture quality is best with a generated data quantity under a predetermined value.

In this case, the intra-/inter-frame discriminator 21 assumes that encoding is completed up to a certain frame. With this assumption, the generality is not lost because the encoding process proceeds progressively. Under this assumption, a target frame is encoded by inter-frame encoding using the step size used for the preceding frame. The quantity of data that is generated is referred to as "Binter".

Likewise, the target frame is encoded by intra-frame encoding using the step size used for the preceding frame. The quantity of data that is generated is referred to as "Bintra". Comparison of "Binter" and "Bintra" permits comparison of the data quantity for obtaining a certain picture quality determined by the step size. Thus, it is possible to select encoding of better picture quality within a fixed generated data quantity.

More specifically, if a relation of formula (1) holds, $$Binter > Bintra \tag{1}$$

the intra-frame encoding is selected, and otherwise the inter-frame encoding is selected.

In this way, using the generated data quantity as the subject of comparison, an optimum encoding system can be selected stringently in the sense that the quantity of the generated data is less under a condition of a fixed picture quality. In practice, however, it is necessary to perform encoding by both the inter- and intra-frame encoding processes and calculate the generated data quantities in the individual processes. This means that the operation consists of two passes for each of the inter- and intra-frame encoding processes, and the extent of the encoding process is double or more than in the case of a single pass operation.

Second Constitution

Figure 7:
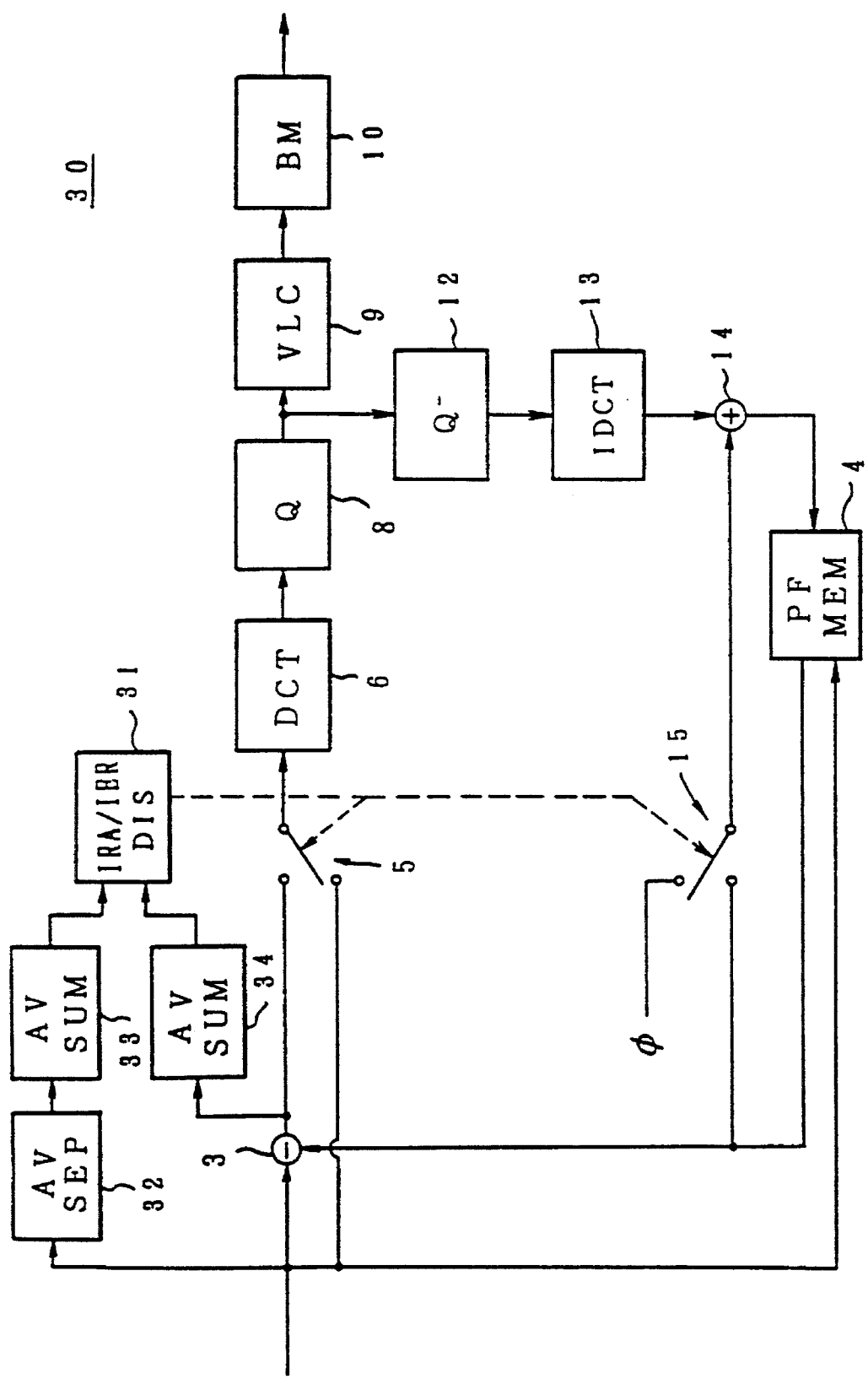
FIG. 7 is a block diagram showing a third embodiment of the motion picture encoding system according to the present invention.

FIG. 7 shows a third embodiment of the motion picture encoding system 30. In the figure, parts corresponding to those in FIG. 6 are designated by like reference numerals. Here, an intra-/inter-frame discriminator 31 is adapted to use an index indirectly indicating the generated data quantity as the subject of comparison instead of the generated data quantity as in the case of the first constitution.

More specifically, the subject of comparison is the sum of the absolute values of pixel data in the frame to be encoded. First, for encoding a target frame, inter-frame difference data are calculated as preparation for the inter-frame encoding.

The difference data is detected on the basis of continuous intra-frame pixel data and inter-frame pixel data calculated in average value separation circuit 32 and absolute value summation circuits 33 and 34, and it is used as an index indirectly representing the quantity of data generated in intra- and inter-frame encoding.

First the sum of the absolute values is obtained for the inter-frame difference data, and it is referred to as "Sinter". Then, for the sake of comparison, intra-frame difference data is calculated by subtraction of the DC component in the frame for using as the index indirectly indicating the generated data quantity for intra-frame encoding. The sum of absolute values of the difference data is referred to as "Sintra".

In this case, "Sinter" and "Sintra" indirectly represent the generated data quantities of pictures encoded by the inter- and intra-frame encoding processes, respectively.

Thus, if a relation of formula (2) holds, $$Sinter > Sintra \tag{2}$$

the target frame is intra-frame encoded, and otherwise it is inter-frame encoded.

In this way, using the sum of absolute values of picture to be encoded as the subject of comparison, actually there is no need of encoding. Thus, a far smaller extent of extra processing is necessary compared to the encoding in the preceding case. Correctly, it is necessary to obtain the sum of the absolute values of the difference data obtained as a result of subtraction of the DC component in the frame. Of course, it is impossible to optimally select of the encoding system in a stringent sense, but it is possible to obtain selection with a practically sufficient accuracy.

Third Constitution

Figure 8:
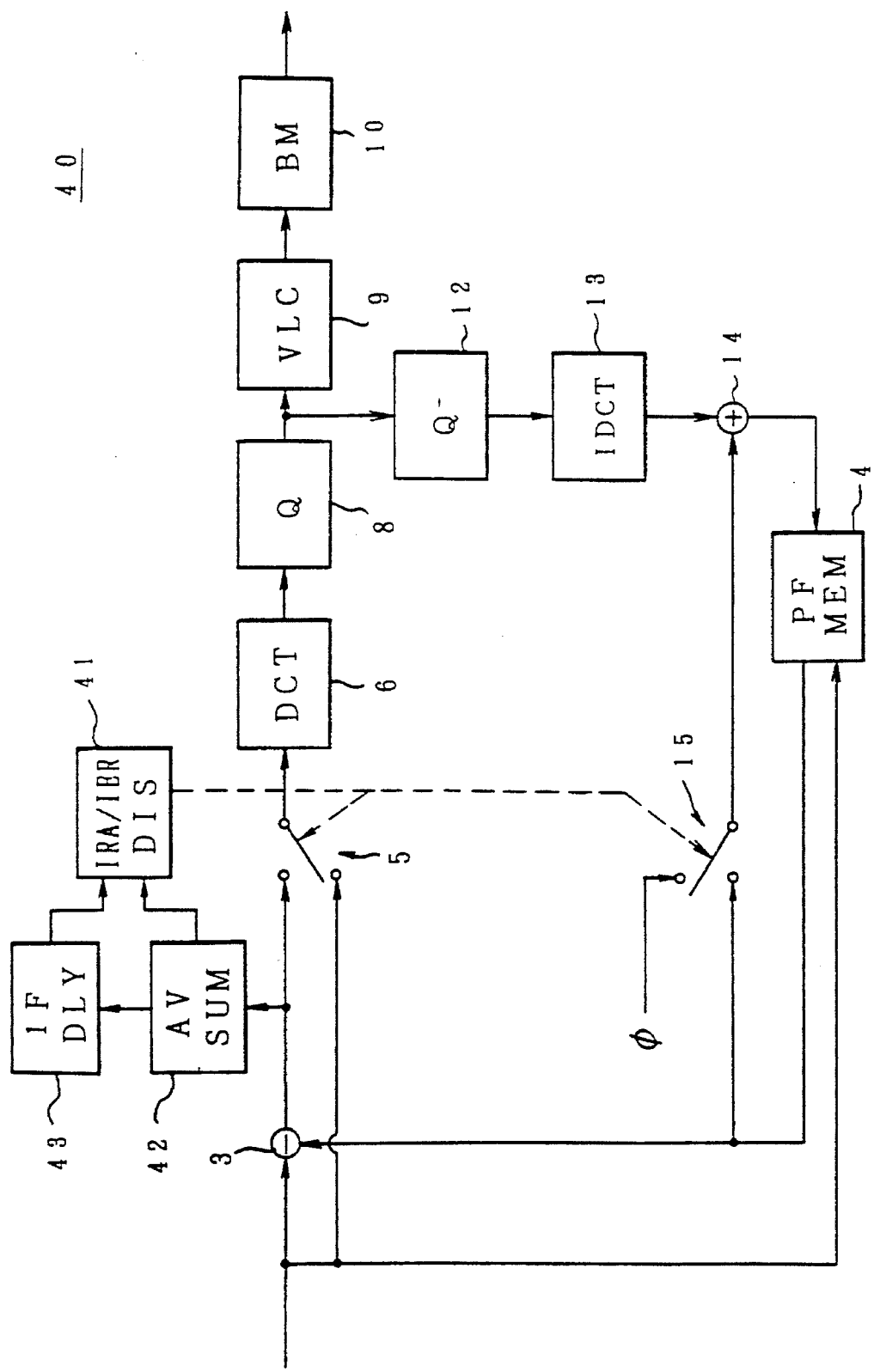
FIG. 8 is a block diagram showing a fourth embodiment of the motion picture encoding system according to the invention.

FIG. 8 shows a fourth embodiment of the motion picture encoding system 40. In the figure, parts corresponding to those in FIG. 7 are designated by like reference numerals. In the above second constitution, an extra process has been necessary for the encoding system selection. To minimize the extra process, in this instance an intra-/inter-frame discriminator 41 determines the inter/intra-frame encoding system selection by using only the sum of absolute values of inter-frame difference data obtained in an absolute value summation circuit 42 and a one-frame delay circuit 43.

More specifically, like the preceding constitution, the sum of absolute values of inter-frame difference data is obtained as an index indirectly representing the quantity of data generated by inter-frame encoding, and it is referred to as "Sinter(n)". When actually encoding a motion picture sequence in a certain order, "Sinter" of an n-th frame to be processed is referred to as "Sinter(n)".

Then, it is assumed that this frame has been inter-frame encoded, and under this assumption "Sinter" of the (n+1)-th frame to be encoded next is obtained and referred to as "Sinter(n+1)". In a general motion picture sequence, the statistical characters are not changed so much unless the picture content is changed.

Conversely, when the statistical characters have been changed greatly, it may be thought that the picture content has been changed greatly. Using this character and adopting "Sinter" as a statistical quantity, changes in "Sinter" with time are examined. In this way, it is possible to detect a frame, the picture content of which has been changed. For this frame with the picture content thereof having been changed, higher encoding efficiency can be obtained if intra-frame encoding rather than inter-frame encoding is selected.

Thus, "Sinter(n)" and "Sinter(n+1)" are compared, and if a relation of formula (3) holds, $$\text{Sinter}(n+1) > \text{Sinter}(n) \times M \tag{3}$$

the target frame is intra-frame encoded, and otherwise it is inter-frame encoded. Here, M represents a constant, for instance "3".

In this way, with the sum of absolute values of inter-frame difference data used as the subject of comparison, there is no need of obtaining a new value from a calculated value at the time of the actual encoding. Thus, the excess processing necessary for the determination is only to the extent of the determination concerning the formula (3). Thus, less processing is needed in comparison to the case of the above constitution as well. However, a memory is necessary to store "Sinter". In addition, it is of course impossible to obtain optimum encoding system selection in a stringent sense, but it is possible to obtain selection with a practically sufficient accuracy.

Fourth Constitution

Figure 9:
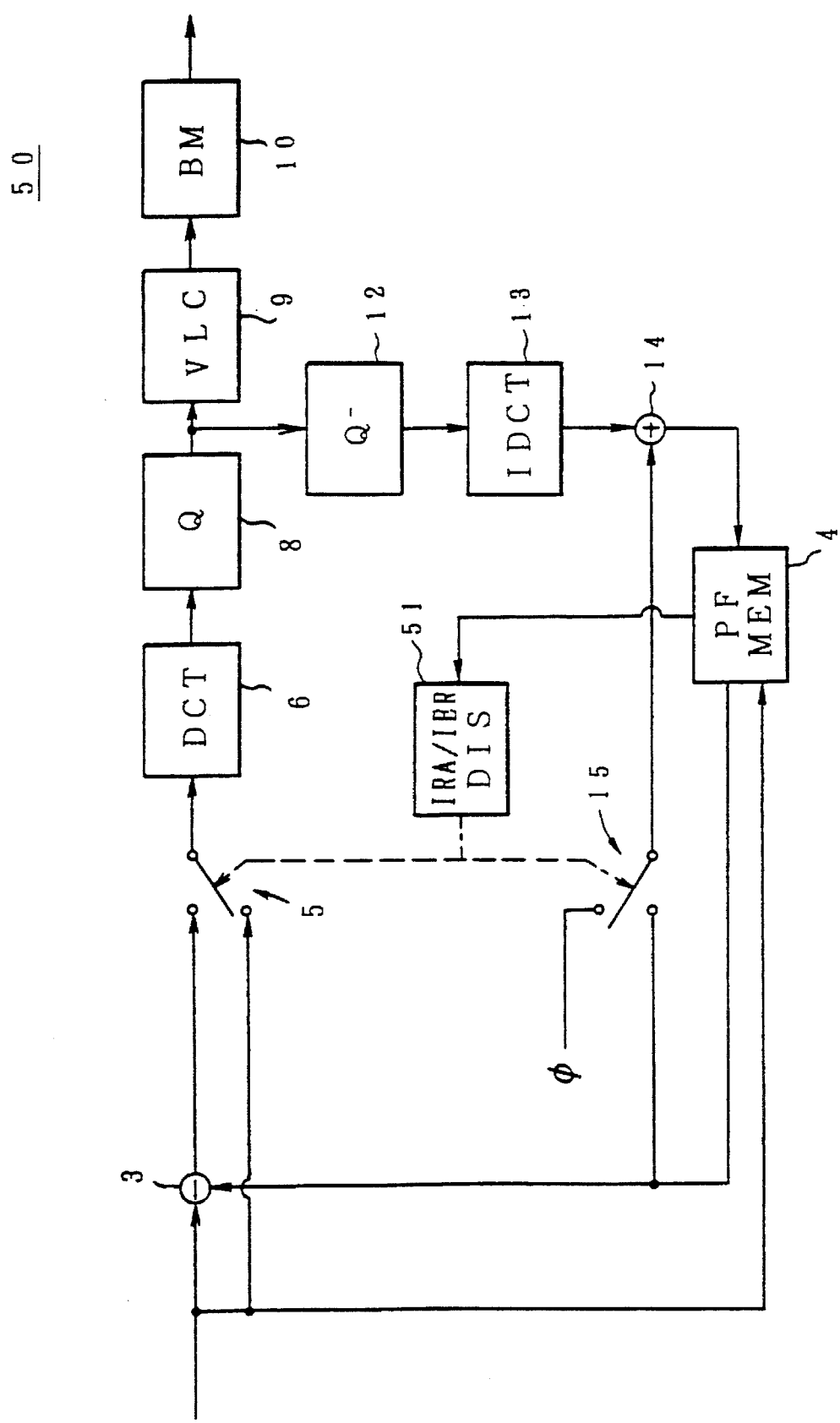
FIG. 9 is a block diagram showing a fifth embodiment of the motion picture encoding system according to the invention.

FIG. 9 shows a fifth embodiment of the motion picture encoding system 50. In the figure, parts corresponding to those in FIG. 8 are designated by like reference numerals-. An intra-/inter-frame discriminator 51 effects inter-frame encoding and, using the result, effects inter-/intra-frame selection.

More specifically, when a certain frame is inter-frame encoded, a determination is made for each small area as to whether inter- or intra-frame encoding is to be done. In consequence, intra-frame encoding is selected for most small areas of a frame, which are to be intra-frame encoded for such reason as that the picture content has been changed.

By utilizing this character, first inter-frame encoding is done, and intra-frame encoding is selected for a frame, in which intra-frame encoding is selected for most small areas. In this case, if intra-frame encoded small areas are more than N percent of all the small areas, i.e., if a relation of formula (4) holds, $$\left(\begin{array}{c}\text{Number of infra-frame}\\\text{encoded small areas}\end{array}\right) \Big/ \left(\begin{array}{c}\text{Number of all}\\\text{the small areas}\end{array}\right) \times 100 > N \tag{4}$$

the target frame is intra-frame encoded, and otherwise it is inter-frame encoded.

In this way, performing the inter-frame encoding and using the result thereof for selecting the encoding system, if the number of small areas with the intra-frame encoding selected therefor is smaller than a threshold value so that the pertinent frame is inter-frame encoded, the inter-frame encoding for examination directly constitutes the result. Thus, there is neither any overhead or any necessity of obtaining any statistical quantity. The extent of the processing thus is not increased at all.

On the other hand, if intra-frame encoding is selected for that frame, the frame is intra-frame encoded afresh. In this case, therefore, the inter-frame encoding for examination constitutes an overhead. However, if the probability of selection of the intra-frame encoding is low, the overhead is very slight.

With the above constitution, optimum selection of the intra- or inter-frame encoding can be obtained by collecting information of a motion picture sequence to be encoded in advance. It is thus possible to realize a motion picture encoding system, which permits both random access property and high encoding efficiency to be obtained at a time with selection of the intra-frame encoding, for instance, in correspondence to a scene change or to an increase of the extent of motion in the scene although the scene itself is not changed.

Figure 10:
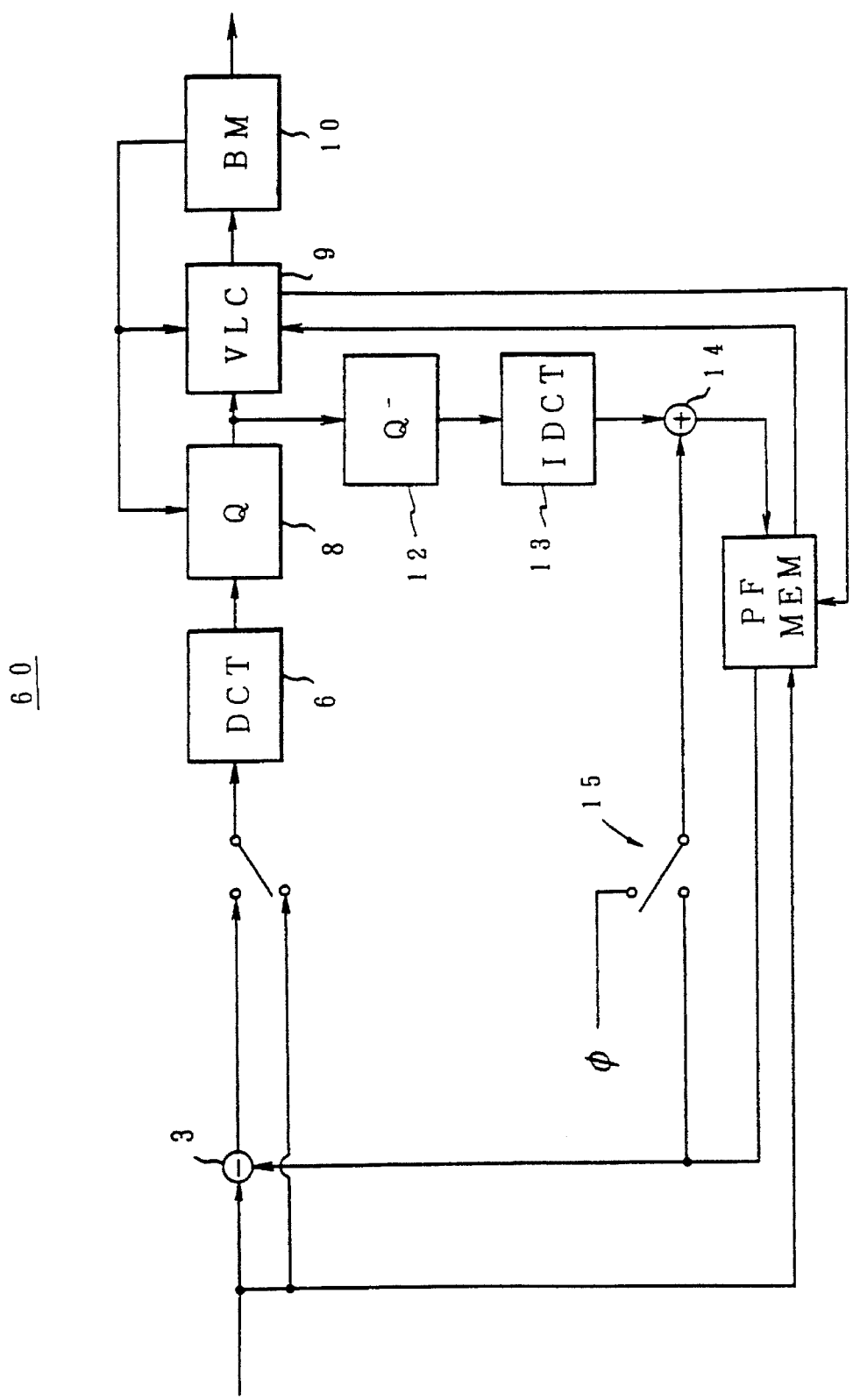
FIG. 10 is a block diagram showing a sixth embodiment of the motion image encoding system according to the invention.

FIG. 10 shows a sixth embodiment of the motion picture encoding system 60. In the figure, parts corresponding to those in FIG. 2 are designated by like reference numerals. In the motion picture encoding/decoding system of such construction, there is no limitation as to whether a certain frame is intra-frame encoded or forward, rearward and bi-directional predictive inter-frame encoded.

Therefore, it is important to determine an optimum combination intra- and inter-frame encoding pattern in a sense that the image quality is best within a fixed generated data quantity. It is now assumed that a certain frame is intra-frame or forward predictive inter-frame encoded. With this assumption, the generality is not lost because the process proceeds with the intra-frame or forward predictive inter-frame encoding as a unit.

In this case, the next and following frames are encoded with a pattern as shown in FIG. 11. In FIG. 11, X represents a frame having been intra- or forward predictive inter-frame encoded, P represents a frame to be forward predictive inter-frame encoded, B represents a bi-directional predictive inter-frame encoding, and M represents the distance between forward predictive frames.

In this algorithm, when the encoding system is fixed as a feature of inter-frame encoding system, the relation between the value of M and the generated data quantity is such that the generated data quantity is reduced with increasing value of M, has a minimum at a certain value of M and is increased with increase of M from that value.

In this instance, when the inter-frame distance M is not large in correspondence to motion information of a motion picture, the correlation is high for the inter-frame distance is not high, and the redundancy can be removed by obtaining the inter-frame difference data. It is thus possible to suppress the generated data quantity. On the other hand, since the inter-frame distance M is not large, the number of intermediate frames which are bi-directional predictive inter-frame encoded is small, and the efficiency is low.

When the inter-frame distance M is large, the correlation is high because of the low inter-frame distance, and the inter-frame redundancy is not so much. Therefore, it is impossible to suppress the generated data quantity. On the other hand, because of the large inter-frame distance, the number of intermediate frames which are bi-directional predictive inter-frame encoded are large, and the efficiency is high.

It will be seen that there are two opposite characters, and the generated data quantity does not become minimum with an excessively large or small value of M. By obtaining the value of M which can provide the minimum generated data quantity, an optimum encoding pattern providing the highest picture quality can be determined under a fixed data quantity condition.

This algorithm can be inductively expanded in the general case by explaining the cases where the distance between forward predictive frames is 1, 2 and N. First, in the case when the distance between forward predictive frames is 1, frames up to the first frame are encoded with pattern with M=1 to obtain the generated data quantity or a statistical quantity which permits estimation of the generated data quantity. The generated data quantity or statistical value permitting estimation thereof up to the first frame is referred to as D(1).

In the case when the distance between forward predictive frames is 2, frames up to the second frame are encoded with pattern with M=2 to obtain the generated data quantity or the statistical quantity permitting estimation thereof. The generated data quantity or statistical quantity permitting estimation thereof is referred to as D(2).

To determine whether the efficiency of the pattern with M=1 or the pattern with M=2 is higher, D(1) and D(2) are compared. In this case, it is necessary to equalize the number of encoded frames. Therefore, D(2) is converted into one frame unit.

More specifically, D(1) and D(2)/2 are compared. If D(1) is less, higher efficiency can be obtained with the pattern of M=1 rather than the pattern of M=2 for encoding. Thus, the pattern of M=1 is used for encoding up to the first frame. When the encoding pattern is determined in this way, the routine is ended, and the initial state is restored.

If D(2)/2 is less, higher efficiency can be obtained with the pattern with M=2 rather than the pattern with M=1. Thus, the routine goes to the third step to extend the scope of examination up to the third frame.

In the case when the distance between frames is N, frames up to the N-th frame are encoded with pattern of M=N to obtain the generated data quantity or the statistical value permitting estimation thereof. The generated data quantity or the statistical value permitting estimation thereof is referred to as D(N).

To determine whether the efficiency of the pattern with M=(N−1) or the pattern with M=N is higher, D(N−1) and D(N) are compared. In this case, it is necessary to equalize the number of encoded frames. Thus, one frame unit conversion is effected.

More specifically, D(N)/N−1)/(N−1) and D(N) are compared. If D(N−1)/(N−1) is less, higher efficiency can be obtained with the pattern with M=N−1 rather than the pattern with M=N. Thus, frames up to the (N−1)-th frame are encoded with the pattern with M=N−1. When the encoding pattern is determined in this way, the routine is ended, and the initial state is restored.

If D(N)/N is less, higher efficiency can be obtained with the pattern with M=N rather than the pattern with M=N−1. Thus, the routine goes to the (N+1)-th step to extend the scope of examination up to the (N+1)-th frame. It will be seen that the encoding pattern can be determined inductively by repeatedly executing the examination as above.

With the above constitution, an optimum combination intra- and forward, rearward and bi-directional inter-frame encoding pattern can be selected for every N frames by preliminarily collecting information of a motion picture sequence to be encoded. It is thus possible to realize a motion picture encoding system, which permits pronounced improvement of the encoding efficiency.

Other Embodiments

The above embodiments of the invention have concerned with the encoding of motion video signal in a video signal transmission system such as a television telephone system. However, this is by no means limitative, and the invention is suitably applicable to the case of encoding and recording motion video signal in optical disk systems or the like.

As has been described in the foregoing, by setting priority orders in conformity to, for instance, man's sight characteristics, it is possible to obtain encoding matched to man's sight characteristics, and by setting a high priority order for a picture portion attracting attention it is possible to obtain preferential high picture quality encoding of that portion. It is thus possible to realize a motion picture encoding system, which can flexibly cope with various kinds of pictures and can enhance the subjective picture quality.

Further, an optimum combination intra- and forward, rearward and bi-directional predictive inter-frame encoding pattern can be selected for every N frames by preliminarily collecting information of a motion picture sequence to be encoded. In addition, optimum selection of intra- or inter-frame encoding can be obtained for every frame. It is thus possible to realize a motion picture encoding system, which selects intra-frame encoding in correspondence to, for instance, a scene change or to an increase of the motion extent in the scene although the scene itself is not changed, thus providing both the random access property and high encoding efficiency at a time.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A motion picture encoding system for either intra-frame encoding or inter-frame encoding a motion picture which includes a sequence of frames, comprising:

a first encoding means for encoding at least a portion of the motion picture by intra-frame encoding;

a second encoding means for encoding at least a portion of the motion picture by inter-frame encoding;

means for obtaining inter-frame difference data for a current frame;

means for obtaining inter-frame difference data for a frame next to be encoded; and means for selecting the first encoding means if the difference data for the next frame to be encoded is greater than a multiple of a predetermined integer (equal to or greater than one) times the difference data for the current frame, and otherwise selecting the second encoding means.

* * * * *